April 25, 1961
J. E. ROBINSON
2,981,576
COMBINATION TABLE AND FOOTREST
Filed Sept. 2, 1958
2 Sheets-Sheet 1
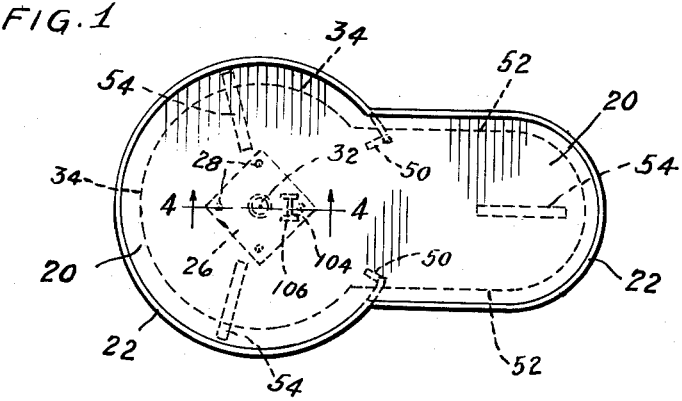
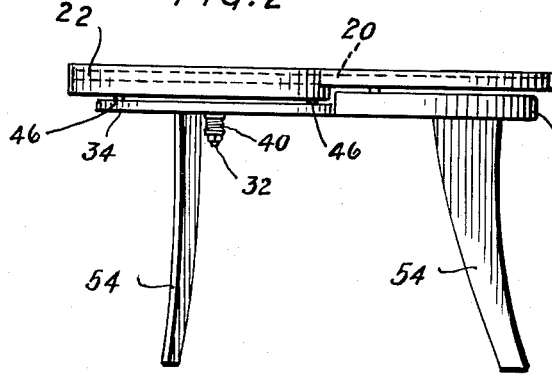
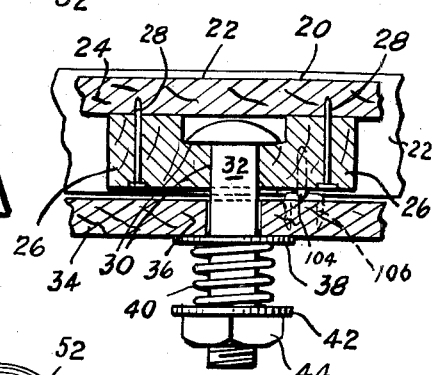
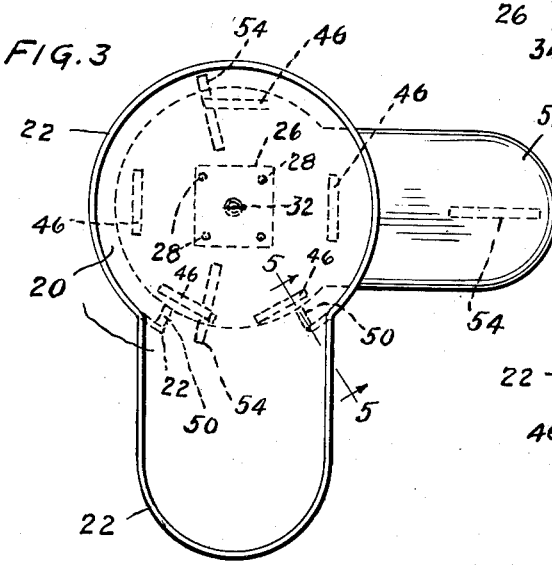
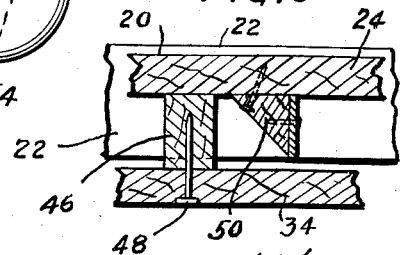
INVENTOR
JOHN E. ROBINSON
BY *Ray Eilers* ATT'Y.

April 25, 1961  J. E. ROBINSON  2,981,576
COMBINATION TABLE AND FOOTREST
Filed Sept. 2, 1958  2 Sheets-Sheet 2
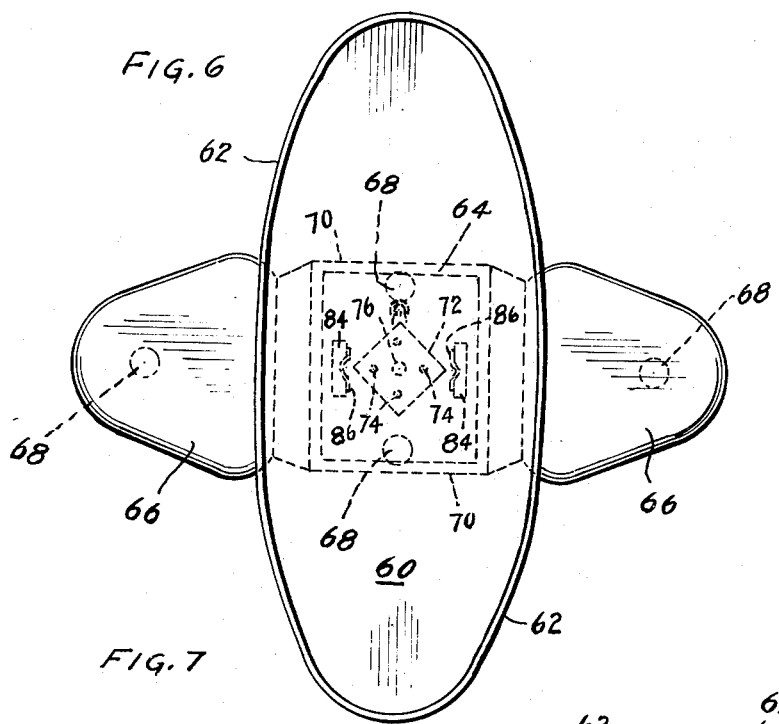
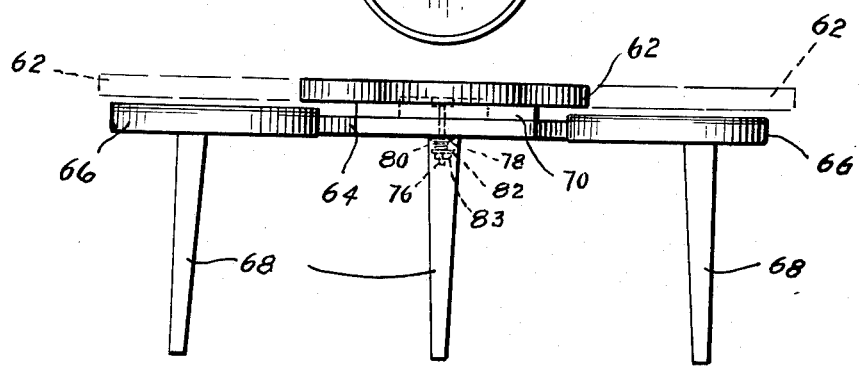
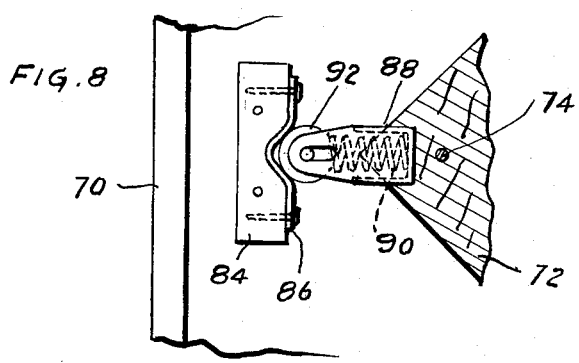
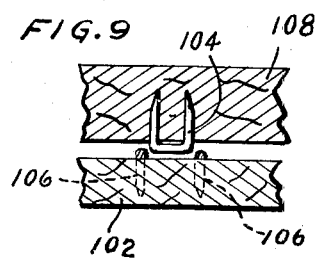
INVENTOR
JOHN E. ROBINSON
BY
ATT'Y.

United States Patent Office 2,981,576
Patented Apr. 25, 1961

2,981,576
COMBINATION TABLE AND FOOTREST
John E. Robinson, Oakes Drive, Crystal City, Mo.
Filed Sept. 2, 1958, Ser. No. 758,306
4 Claims. (Cl. 311—32)

This invention relates to improvements in furniture. More particularly, this invention relates to improvements in coffee tables.

It is therefore an object of the present invention to provide an improved coffee table.

Coffee tables are ornamental pieces of furniture, and they can some times be useful pieces of furniture. However, their usefulness is generally limited to those occasions where the users are willing to sit upright or to lean forward; it usually being necessary for the user to sit upright or to lean forward to reach objects on the coffee tables. Because it is seldom comfortable to sit upright or to lean forward for appreciable periods of time, coffee tables are usually more ornamental than utilitarian. The present invention, however, provides a coffee table that is not only ornamental but is also utilitarian; and that table can be reached even when the users are not sitting upright or leaning forwardly. In fact, that table can be reached by a user who is leaning back in his chair. Consequently, the present invention provides a coffee table that is of far more value than any standard coffee table. It is therefore an object of the present invention to provide a coffee table that does not require the user to sit upright or lean forward, but that instead can be used when the user is leaning back in his chair.

The coffee table provided by the present invention is a combination table and footrest. That coffee table has a polished upper portion which serves as a table and it has a lower portion, normally overlain by the polished upper portion, which is padded and which serves as a footrest. When the coffee table is to be used in the manner in which standard coffee tables are used, the upper portion is disposed above, and in register with, the lower portion. That upper portion will preferably overlie and practically conceal the lower portion so that the coffee table will, to most observers, be a standard coffee table. However, where that coffee table is to be used as a footrest, or as a coffee table than can be reached by a user leaning back in his chair, or as both, the upper portion is displaced from the lower portion; and that upper portion is set close to the side of the user. Thereupon the user can rest his feet on the lower portion, or easily reach the upper portion with his hand, or both. It is therefore an object of the present invention to provide a coffee table which has a lower portion that can serve as a footrest, which has an upper portion that can serve as a table, and which has the upper portion disposable in register with and overlying the lower portion or disposable adjacent the side of the user.

Such a coffee table minimizes wearing of the rugs adjacent the chairs or couches in which the users of that table sit, because those users will recurrently rest their feet on the lower portions of that table. Also, the coffee table minimizes staining and burning of those rugs and of the table itself, because the upper portion of that table is close enough to the user to enable that user to have full control of glasses, cigars and cigarettes as he picks them up and sets them down.

Many standard coffee tables are rectangular in plan, and those tables usually have a leg at each of the four corners thereof. When such a coffee table is set adjacent a couch or divan, two of the four legs are necessarily set closely adjacent that couch or divan; and those two legs make it awkward and inconvenient for anyone to sit down on, or to arise from, that portion of the couch or divan which is adjacent the coffee table. The present invention obviates this difficulty by providing a coffee table that does not have corners with legs at those corners, and also by mounting those legs so they are disposed inwardly of the edges of the table. As a result, anyone can easily sit down on, or arise from, that portion of the couch or divan which is adjacent the coffee table of the present invention. Further, once that person is seated on the couch or divan, he will have more toe room because of the disposition of the legs inwardly of the edges of the table. Moreover, by making the coffee table so it does not have corners with legs at those corners, the present invention makes it easier to clean underneath that table. It is therefore an object of the present invention to provide a coffee table that has its legs spaced inwardly from the edges thereof and that does not have corners with legs at those corners.

In providing a coffee table that can serve as a footrest as well as a coffee table, the present invention reduces the number of pieces of furniture needed in a room, and thereby provides more available floor space for the room. For example, the coffee table provided by the present invention obviates any need of footrests or hassocks. Moreover, because the footrest portion of the coffee table can be used as a seat, the present invention enables the householder to do without one chair that would otherwise be needed. Not only does the present invention make it possible to save the cost of the extra pieces of furniture, and not only does it make more floor space of the room available, but it also minimizes the risk of injury caused by tripping over closely spaced articles of furniture.

When the upper portion of the coffee table is disposed so it is out of register with the lower portion, one person can sit on that lower portion and rest his plate and glass on the adjacent area of the upper portion while one or more other persons can place their chairs adjacent other areas of that upper portion and can place their plates and glasses on those areas. Consequently, the coffee table makes available to the householder a great number of possible arrangements for the furniture in the room.

Other and further objects and advantages of the present invention should become apparent from an examination of the drawing and accompanying description.

In the drawing and accompanying description, two preferred embodiments of the present invention are shown and described but it is to be understood that the drawing and accompanying description are for the purpose of illustration only and do not limit the invention and that the invention will be defined by the appended claims.

In the drawing, Fig. 1 is a plan view of one embodiment of coffee table that is made in accordance with the principles and teachings of the present invention.

Fig. 2 is a side elevational view of the coffee table shown in Fig. 1,

Fig. 3 is a plan view of the coffee table of Figs. 1 and 2, and it shows the upper portion of that table set out of register with the lower portion of that table.

Fig. 4 is a sectional view through a portion of the table of Figs. 1–3, and it is taken along the plane indicated by the line 4—4 in Fig. 1, Fig. 5 is a sectional view through a portion of the table of Figs. 1–3, and it is taken along the plane indicated by the line 5—5 in Fig. 3, Fig. 6 is a plan view of another embodiment of coffee table that is made in accordance with the principles and teachings of the present invention, and it shows that coffee table with the upper portion thereof set out of register with the lower portion thereof, Fig. 7 is a side elevational view of the coffee table shown in Fig. 6, Fig. 8 is an enlarged view of an aligning device usable with the coffee table of Figs. 6–8, and Fig. 9 is an enlarged view of another aligning device usuable with the coffee table of Figs. 1–5.

Referring to the drawing in detail, the numeral 20 denotes the polished upper surface of the upper portion 24 of one form of coffee table that is made in accordance with the principles and teachings of the present invention. The polished upper surface 20 is comparable to the upper face of a standard coffe table. In the particular form shown in the drawing, the upper portion 24 and its polished upper surface 20 are circular in plan with an elongated arm projecting radially therefrom. The numeral 22 denotes a rim which is secured to and extends around the periphery of the upper portion 24, and that rim projects a short distance above the polished upper surface 20.

The numeral 26 denotes a pivot block which has a vertically-directed opening 30 through it; and the upper end of that opening is enlarged to define a recess. Fasteners 28 extend upwardly through the pivot block 26 and seat in the upper portion 24 to fixedly secure that upper portion and that pivot block together. The fasteners are shown as nails, but they could be screws or the like. If desired, glue or cement could be used, either in addition to the fasteners or by itself, to fixedly secure the pivot block 26 and the upper portion 24 together. The recess at the top of the opening 30 in pivot block 26 receives the head of a bolt 32.

The numeral 34 denotes the lower portion of the coffee table provided by the present invention. That lower portion has a configuration, in plan, that is generally similar to the configuration, in plan, of the upper portion 24; but that lower portion is smaller than that upper portion, as shown particularly by Fig. 2. The lower portion 34 has an opening 36 through it, and the threaded shank of the bolt 32 extends downwardly through that opening. A washer 38 telescopes upwardly over the downwardly projecting lower end of the shank of bolt 32, and a helical compression spring 40 also telescopes over that end of that shank and abuts the lower face of the washer 38. A washer 42 telescopes over the lower end of the shank of bolt 32 and abuts the lower end of the spring 40. A nut 44 is mounted on the threaded end of the shank of bolt 32, and that nut can be used to compress the spring 40 and thereby establish a predetermined frictional resistance to the rotation of the upper portion 24 relative to the lower portion 34 of the coffee table.

Five blocks 46 extend upwardly from the upper face of the lower portion 34, and those blocks engage and bear against the lower face of the upper portion 24. Those blocks are secured to the lower portion 34 by fasteners 48 which extend upwardly through that lower portion and seat in the blocks 46. Those fasteners are shown in the form of nails, but they could be screws or the like. The fasteners 48 could, if desired, be supplemented or supplanted by glue or cement. Each of the blocks 46 has approximately the same vertical dimension as does the pivot block 26, and those blocks prevent tilting or rocking of the upper portion 24 relative to the lower portion 34 of the coffee table. This resistance to rocking or tilting is provided in all rotated positions of the upper portion 24.

The numeral 50 denotes blocks which are generally triangular in configuration, and which depend downwardly from the lower face of the upper portion 24. Those blocks receive and hold part of the rim 22 of the coffee table. As indicated particularly by Fig. 3, the rim 22 follows the outer periphery of the upper portion 24; and that rim is of full height where it is secured to the circular part of the upper portion 24, but it has its lower part cut away where it is secured to the radially extending arm of that upper portion. The ends of the lower part of that rim are secured to the blocks 50 by fasteners, all as indicated by Fig. 5.

The radially extending arm of the lower portion 34 has a padded or upholstered portion 52 which is soft to the touch. That padded or upholstered portion is spaced below the bottom of the upper portion 24, as shown particularly by Fig. 2; and that padded or upholstered portion can be overlain by that upper portion, as shown by Fig. 1, or it can be exposed by rotation of that upper portion to the position shown by Fig. 3. The padded or upholstered portion 52 can comfortably receive and comfortably support a person's legs or feet; and it can also serve as a seat.

Three curved legs 54 depend downwardly from the lower portion 34 of the coffee table, and they provide full support for that coffee table. Those legs are not set adjacent corners of the table, as are the legs of most standard coffee tables; instead one leg is set adjacent the end of the radially extending arm of the lower portion 34, and the other two legs are spaced inwardly from the end of the circular part of the lower portion 34. Further, those legs are disposed inwardly of the edges of the lower portion 34 and are thus disposed even further inwardly of the edges of the upper portion 24; and yet those legs are spaced far enough apart to resist tilting of the coffee table when the upper portion 24 is in the position shown by Fig. 3.

When the upper portion 24 is in the position shown by Fig. 1, the coffee table can serve as a standard and usual coffee table. However, where desired, the upper portion 24 can be rotated to the position shown by Fig. 3; and in that position the coffee table can serve both as a coffee table and a footrest, or can serve both as a coffee table and chair. For maximum comfort and accessibility, the coffee table can be placed with the axis of the radially extending arm of the lower portion 34 parallel to the front edge of the chair or couch; and at such time, the radially extending arm of the upper portion 24 will be adjacent the user's side and will thus be immediately adjacent the hand of that user. That radially extending arm of the upper portion 24 can, in the case of a couch, extend over one of the cushions of that couch and can, in the case of a chair, extend adjacent one arm of that chair. In this way, full and comfortable support is assured for the user's feet and legs, and immediate access to the upper portion 24 is also assured.

Referring to Figs. 6–8, the numeral 60 denotes a generally ovate upper portion of a coffee table. A rim 62 is secured to and extends around the periphery of the upper portion 60. Disposed below the level of the upper portion 60 is the lower portion 64. That lower portion has a configuration similar to that of the upper portion 60, but it has two padded or upholstered portions 66 adjacent the ends thereof. That lower portion also has a central area which is not padded or upholstered. Four tapered legs 68 are fixedly secured to and depend downwardly from the lower portion 64, and those legs are spaced well inwardly of the edges of the lower portion 64. However, those legs are spaced far enough apart to provide full and adequate support for the coffee table.

The numeral 70 denotes an upstanding box-like structure that is secured to the central area of the lower portion 64. That box-like structure extends upwardly toward, and abuts, the under face of the upper portion 60;

and that box-like structure helps prevent tilting or rocking of that upper portion.

The numeral 72 denotes a pivot block that is secured to and depends downwardly from the upper portion 60. The pivot block 72 is similar to, and performs the same function as, the pivot block 26 of Figs. 1–4. Fasteners 74 extend upwardly through the pivot block 72 and seat in the upper portion 60. The pivot block 72 will be of a height comparable to the height of the box-like bearing structure 70.

A bolt 76, comparable to the bolt 32 of Figs. 1–4, extends downwardly through the pivot block 72 and through an opening, not shown, in the lower portion 64. A washer 78 telescopes over the downwardly depending lower end of that bolt and abuts the bottom face of the upper portion 64. A helical compression spring 80 abuts the lower face of the washer 78, and it has its lower end supported by a washer 82. A nut 83 is mounted on the threaded lower end of the bolt 76 and underlies the washer 82; and that nut compresses the spring 80 to provide the desired amount of frictional resistance to the rotation of the upper portion 60 relative to the lower portion 64.

The numeral 84 denotes two blocks which are fixedly secured to the lower portion 64 and which have notches. Metal facings 86, with notches that are in register with the notches in the block 84, are secured to those blocks. A spring housing 88 is secured to the pivot block 72, and that housing contains a spring 90 which biases a roller 92 outwardly of that housing. However, that spring can yield to permit retraction of the roller into that housing. The roller 92 will coact with the notches in the metal facing 86 to align the upper portion 60 with the lower portion 64 whenever it is desired to place those portions in register with each other. The metal facings 86 also coact with the roller 92 to generate an audible noise that indicates to the householder when the two portions 60 and 64 are actually in register with each other, thereby obviating all need of stooping down or kneeling to make sure that the desired registry has been attained. The metal facings 86 additionally prevent accidental and undesired rotation of the upper portion 60 relative to the lower portion 64. If desired, still further resistance to accidental rotation of the upper portion 60 can be attained by further tightening of the nut 83 on the bolt 76.

The coffee table shown by Figs. 6–8 is particularly useful adjacent a couch or divan on which two persons are seated. With the upper portion 60 rotated out of register with the padded or upholstered portions 66 on the lower portion 64, each person has a padded or upholstered portion to receive his feet and legs, and one end of that upper portion 60 extends over the area of the couch intermediate the two persons. That end of the upper portion 60 provides a table top immediately adjacent the hands of those persons. That coffee table can also be used as a table for four persons; two persons sitting on the padded or upholstered portions 66 and two other persons sitting in chairs adjacent the ends of the upper portion 60.

The numeral 100, in Fig. 9, denotes a pivot block depending downwardly from an upper portion of a coffee table comparable to the upper portion 24 of Figs. 1 and 3–5. The numeral 102 denotes a part of the lower portion of a coffee table comparable to the lower portion 34 of Figs. 1–5. A U-shaped, rounded top staple 104 is secured to the lower face of the upper portion 100, and two U-shaped, flat top staples 106 are secured to the upper face of the lower portion 102. The staples 106 are set in the path of the staple 104, and they provide an aligning action and an audible signal comparable to the aligning action and audible signal provided by the metal facings 86 and the roller 92. The staples 104 and 106 also prevent accidental movement of the upper portion to which the block 100 is secured; but although they prevent accidental shifting of the upper portion, a gentle pressure on that upper portion can cause the staple 104 to apply upward forces that will further compress the spring 40 and let the staple 104 ride up and over either of the staples 106.

The rims 22 and 62 can be interrupted or cut-away at spaced points to facilitate the wiping off, from the upper faces of the upper portions 64 and 60, of crumbs, ashes or the like. However, those interruptions or those cut-away portions will be narrow enough to prevent the passage therethrough of ash trays, glasses or the like.

Whereas the drawing and accompanying description have shown and described two preferred embodiments of the persent invention it should be apparent to those skilled in the art that various changes may be made in the form of the invention without affecting the scope thereof.

What I claim is:

1. An article of furniture that can serve as a table or a footrest or as both and that comprises a generally horizontal support, a plurality of legs that are secured to and that depend downwardly from said support, a padded or upholstered foot-receiving portion at one end of said support that can receive a person's foot, a second padded or upholstered foot-receiving portion at the other end of said support that can receive another person's foot, a table portion that can serve as a table top, an upstanding rim at the periphery of said table portion, said rim being discontinuous to facilitate the wiping off of the upper face of said table portion, a pivot that is carried by said table portion and that depends downwardly from said table portion and that extends through an opening in said support to hold said table portion for rotation relative to said support, a pivot block that is carried by said table portion and that surrounds and encircles said pivot and that depends downwardly from said table portion, said pivot block bearing against and resting upon a portion of said support intermediate said padded or upholstered portions, said table portion being larger than but having the same general configuration as said support, said table portion being disposable in position above and in register with said foot-receiving portions or being disposable out of register with said foot-receiving portions, said table portion serving as a table top that overlies and substantially conceals said support and the said padded or upholstered foot-receiving portions thereof or serves as a table top that exposes said padded or upholstered foot-receiving portions of said support and that has one of its ends adjacent the hands of the persons resting their feet on said padded or upholstered foot-receiving portions of said support, a plurality of blocks that are carried by said support and that extend upwardly toward and bear against said table portion, each of said blocks having substantially the same height as said pivot block and coacting with said pivot block to hold the lower face of said table portion above the level of the tops of said padded or upholstered foot-receiving portions on said support whereby said table portion can rotate relative to said support without marring or scratching said padded or upholstered foot-receiving portions, said plurality of blocks coacting with said pivot block in all rotated positions of said table portion to prevent tilting of said table portion relative to said support, a spring that encircles said pivot and is disposed below said support, a nut that is secured to said pivot and that underlies said spring, said spring acting upwardly against said support and downwardly against said nut to bias said table portion toward said plurality of blocks, a metallic centering surface on said table portion, and a metallic centering surface on said support, said centering surfaces being engageable to align said table portion with said support and to prevent accidental rotation of said table portion relative to said support, said centering surfaces being adapted to generate an audible noise when they engage each other.

2. An article of furniture that can serve as a table or a footrest or as both and that comprises a generally horizontal support, a plurality of legs that are secured to and that depend downwardly from said support, a padded or upholstered foot-receiving portion at one end of said support that can receive a person's foot, a second padded or upholstered foot-receiving portion at the other end of said support that can receive another person's foot, a table portion that can serve as a table top, an upstanding rim at the periphery of said table portion, a pivot that is carried by said table portion and that depends downwardly from said table portion and that extends through an opening in said support to hold said table portion for rotation relative to said support, a pivot block that is carried by said table portion and that surrounds and encircles said pivot, said table portion being larger than but having the same general configuration as said support, said table portion being disposable in position above and in register with said foot-receiving portions or being disposable out of register with said foot-receiving portions, said table portion serving as a table top that overlies and substantially conceals said support and the said padded or upholstered foot-receiving portions thereof or serves as a table top that exposes said padded or upholstered foot-receiving portions of said support and that has one of its ends adjacent the hands of the persons resting their feet on said padded or upholstered foot-receiving portions of said support, a plurality of blocks that are carried by said support and that extend upwardly toward and bear against said table portion, said blocks coacting to hold the lower face of said table portion above the level of the tops of said padded or upholstered foot-receiving portions on said support whereby said table portion can rotate relative to said support without marring or scratching said padded or upholstered foot-receiving portions, said plurality of blocks coacting in all rotated positions of said table portion to prevent tilting of said table portion relative to said support, a spring that encircles said pivot and is disposed below said support, a nut that is secured to said pivot and that underlies said spring, said spring acting upwardly against said support and downwardly against said nut to bias said table portion toward said plurality of blocks, a metallic centering surface on said table portion, and a metallic centering surface on said support, said centering surfaces being engageable to prevent accidental rotation of said table portion relative to said support, said centering surfaces being adapted to generate an audible noise when they engage each other.

3. An article of furniture that can serve as a table or a footrest or as both and that comprises a generally horizontal support, a plurality of legs that are secured to and that depend downwardly from said support, a padded or upholstered foot-receiving portion on said support that can receive a person's foot, a table portion that can serve as a table top, a pivot that is carried by said table portion and that depends downwardly from said table portion and that extends through an opening in said support to hold said table portion for rotation relative to said support, a pivot block that is carried by said table portion and that surrounds and encircles said pivot and that depends downwardly from said table portion, said pivot block overlying a portion of said support spaced from said padded or upholstered portion, said table portion being larger than but having the same general configuration as said support, said table portion being disposable in position above and in register with said foot-receiving portion or being disposable out of register with said foot-receiving portion, said table portion serving as a table top that overlies and substantially conceals said support and the said padded or upholstered foot-receiving portion thereof or serves as a table top that exposes said padded or upholstered foot-receiving portion of said support and that has part thereof adjacent the hand of the person resting his foot on said padded or upholstered foot-receiving portion of said support, a plurality of blocks that are intermediate said support and said table portion, said blocks coacting to hold the lower face of said table portion above the level of the top of said padded or upholstered foot-receiving portion on said support whereby said table portion can rotate relative to said support without marring or scratching said padded or upholstered foot-receiving portion, said plurality of blocks coacting in all rotated positions of said table portion to prevent tilting of said table portion relative to said support, a spring that biases said table portion toward said plurality of blocks, a centering surface on said table portion, and a centering surface on said support, said centering surfaces being engageable to prevent accidental rotation of said table portion relative to said support, said centering surfaces being adapted to generate an audible noise when they engage each other.

4. An article of furniture that can serve as a table or a footrest or as both and that comprises a generally horizontal support, a plurality of legs that are secured to and that depend downwardly from said support, a padded or upholstered foot-receiving portion on said support that can receive a person's foot, a table portion that can serve as a table top, a pivot that holds said table portion for rotation relative to said support, a pivot block that is carried by said table portion and that surrounds and encircles said pivot and that depends downwardly from said table portion, said table portion being larger than but having the same general configuration as said support, said table portion being disposable in position above and in register with said foot-receiving portion or being disposable out of register with said foot-receiving portion, said table portion serving as a table top that overlies and substantially conceals said support and the said padded or upholstered foot-receiving portion thereof or serves as a table top that exposes said padded or upholstered foot-receiving portion of said support and that has part thereof adjacent the hand of the person resting his foot on said padded or upholstered foot-receiving portion of said support, a member that is intermediate said support and said table portion and that holds the lower face of said table portion above the level of the top of said padded or upholstered foot-receiving portion on said support whereby said table portion can rotate relative to said support without marring or scratching said padded or upholstered foot-receiving portion, said intermediate member acting in all rotated positions of said table portion to prevent tilting of said table portion relative to said support, a centering surface on said table portion, and a centering surface on said support, said centering surfaces being engageable to prevent accidental rotation of said table portion relative to said support.

References Cited in the file of this patent

UNITED STATES PATENTS

| | | |
|---|---|---|
| 566,197 | Link | Aug. 18, 1896 |
| 789,813 | Longley | May 16, 1905 |
| 872,256 | Schackner | Nov. 26, 1907 |
| 1,817,186 | Graff | Aug. 4, 1931 |
| 2,470,165 | Hartzler | May 17, 1949 |
| 2,730,416 | Williams | Jan. 10, 1956 |
| 2,783,108 | Walker | Feb. 26, 1957 |
| 2,893,674 | Monaco | July 7, 1959 |